(12) United States Patent
Kohberg et al.

(10) Patent No.: US 8,888,059 B2
(45) Date of Patent: Nov. 18, 2014

(54) FASTENING DEVICE AND HOLDING DEVICE

(75) Inventors: Carsten Kohberg, Dortmund (DE); Marko Schulz, Lünen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 500 days.

(21) Appl. No.: 12/824,537

(22) Filed: Jun. 28, 2010

(65) Prior Publication Data
US 2011/0017885 A1    Jan. 27, 2011

(30) Foreign Application Priority Data

Jul. 24, 2009    (DE) .......................... 10 2009 034 722

(51) Int. Cl.
*F16M 11/00*    (2006.01)
*B60K 15/067*    (2006.01)
*B60R 11/00*    (2006.01)

(52) U.S. Cl.
CPC ......... *B60R 11/00* (2013.01); *B60R 2011/0042* (2013.01); *B60K 15/067* (2013.01); *B60R 2011/004* (2013.01); *B60Y 2200/14* (2013.01)
USPC . 248/201; 248/221.11; 248/393; 248/222.11; 248/397

(58) Field of Classification Search
USPC .................. 248/201, 221.11, 220.21, 222.14, 248/224.8, 205.4, 393, 397, 333.13, 248/222.11; 292/106, 207, 208; 403/324.2, 403/326; 180/219; 297/357, 230.1, 376
See application file for complete search history.

(56) References Cited

U.S. PATENT DOCUMENTS

| | | | | |
|---|---|---|---|---|
| 2,381,633 | A * | 8/1945 | Young ...................... | 292/341.17 |
| 3,784,140 | A | 1/1974 | Auerbach | |
| 4,927,194 | A * | 5/1990 | Wagner ......................... | 292/128 |
| 6,168,224 | B1 | 1/2001 | Henn et al. | |
| 6,349,990 | B1 * | 2/2002 | Park ......................... | 296/216.02 |
| 6,443,344 | B1 * | 9/2002 | Nicosia et al. ................ | 224/413 |
| 6,484,914 | B1 * | 11/2002 | Willey ........................... | 224/413 |
| 6,648,286 | B1 | 11/2003 | Evans et al. | |
| 6,729,515 | B2 * | 5/2004 | Nicosia et al. ................ | 224/413 |
| 6,767,047 | B2 * | 7/2004 | Eichhorst et al. ............. | 296/128 |
| 7,021,692 | B2 * | 4/2006 | Laudenbach et al. ........... | 296/76 |

(Continued)

FOREIGN PATENT DOCUMENTS

| | | |
|---|---|---|
| DE | 91 10 272.3 | 11/1991 |
| DE | 196 50 402 A1 | 6/1998 |

(Continued)

*Primary Examiner* — Terrell McKinnon
*Assistant Examiner* — Monica Millner
(74) *Attorney, Agent, or Firm* — McGlew and Tuttle, P.C.

(57) ABSTRACT

A fastening device (6) for detachably fastening a first component (4) to a second component (5), especially to a motor vehicle. A bearing block (7), which has a stay bolt (13), is fastened to one component (5). The bearing block (7) has an anchor bracket (8), which is fastened to the other component (4) and which has an anchor hook (15) for hooking onto the stay bolt (13). A locking device (16) is provided which can be adjusted between a locking state, in which anchor hook (15) can be hooked into and detached from the stay bolt (13), and an unlocking state, in which stay bolt (13) is fixed to the anchor hook (15) hooked into same.

19 Claims, 5 Drawing Sheets

(56) References Cited

U.S. PATENT DOCUMENTS

| | | | |
|---|---|---|---|
| 7,090,280 B2 * | 8/2006 | Willey | 296/78.1 |
| 7,150,382 B2 * | 12/2006 | Zickefoose | 224/423 |
| 7,226,110 B2 * | 6/2007 | Doncov et al. | 296/121 |
| 7,380,844 B2 * | 6/2008 | Berghahn et al. | 292/201 |
| 7,454,933 B1 * | 11/2008 | Paige et al. | 70/208 |
| 7,611,761 B2 * | 11/2009 | Yuasa et al. | 428/34.1 |
| 7,946,632 B1 * | 5/2011 | Mueller | 292/1 |
| 8,152,217 B2 * | 4/2012 | Tanoi | 296/107.17 |
| 2001/0005090 A1 * | 6/2001 | Haberl et al. | 296/121 |
| 2007/0181757 A1 * | 8/2007 | Sharpe et al. | 248/222.11 |
| 2008/0099645 A1 | 5/2008 | Reichley | |

FOREIGN PATENT DOCUMENTS

| | | |
|---|---|---|
| DE | 299 22 147 U1 | 2/2000 |
| DE | 200 19 309 U1 | 7/2001 |
| DE | 202005018342 U1 | 2/2007 |
| DE | 10 2006 044165 A1 | 3/2008 |
| EP | 2 065 247 A1 | 6/2009 |
| GB | 2 291 462 A | 1/1996 |
| WO | 2004/113110 A1 | 12/2004 |

* cited by examiner

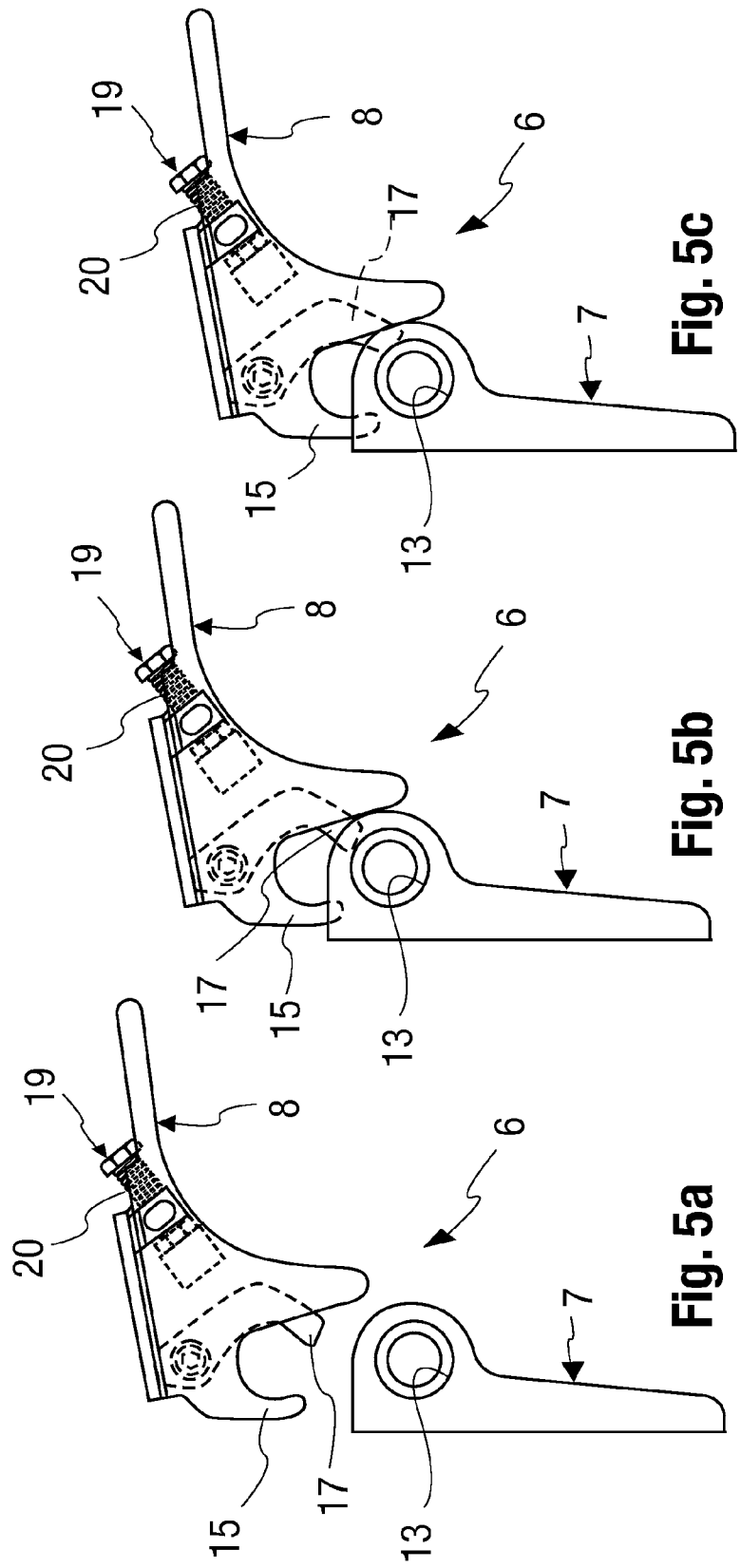

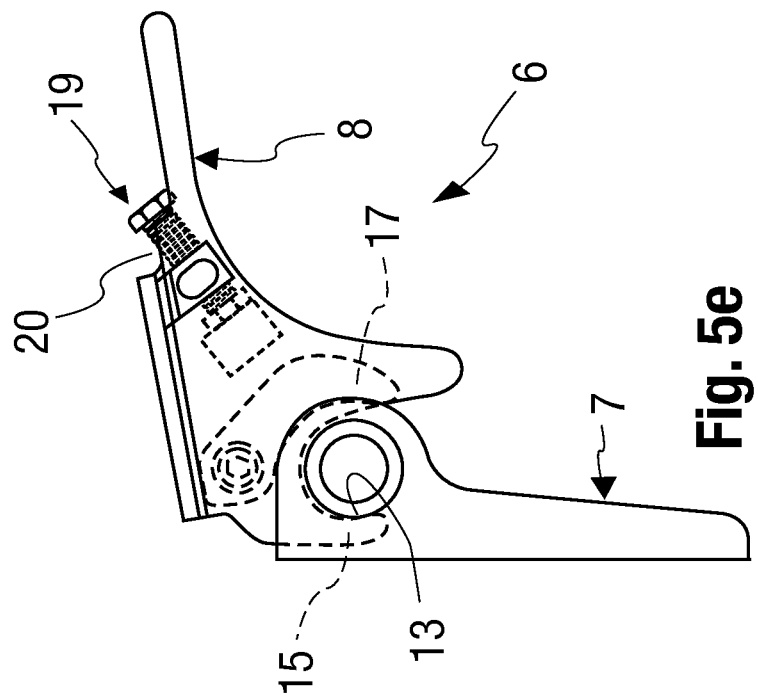
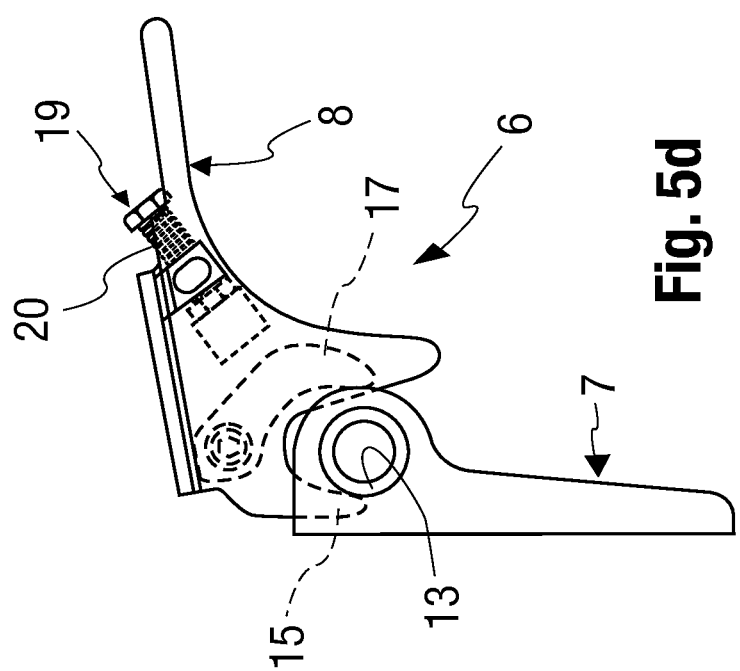

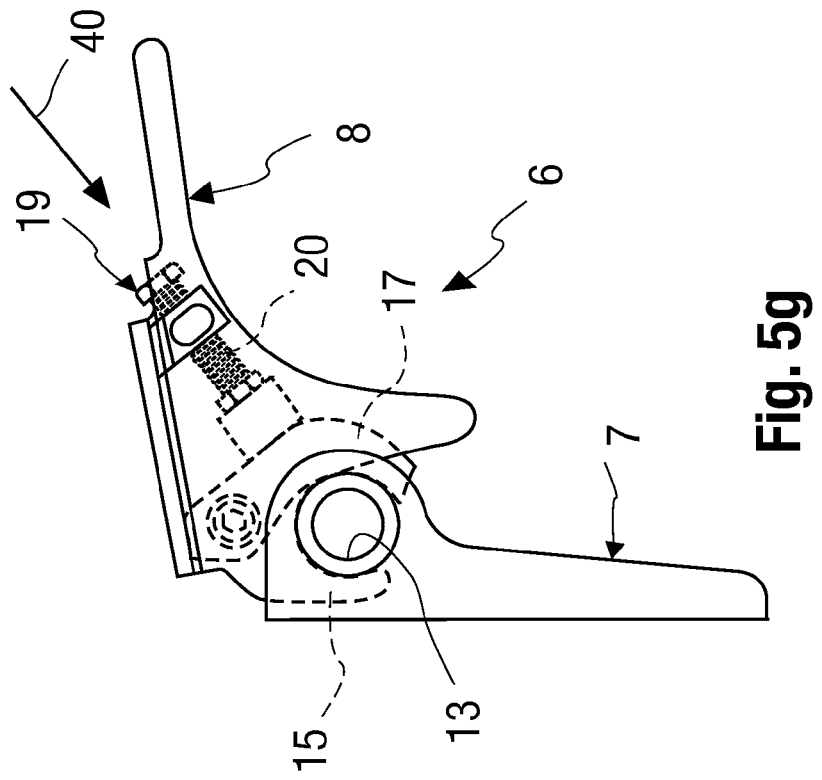
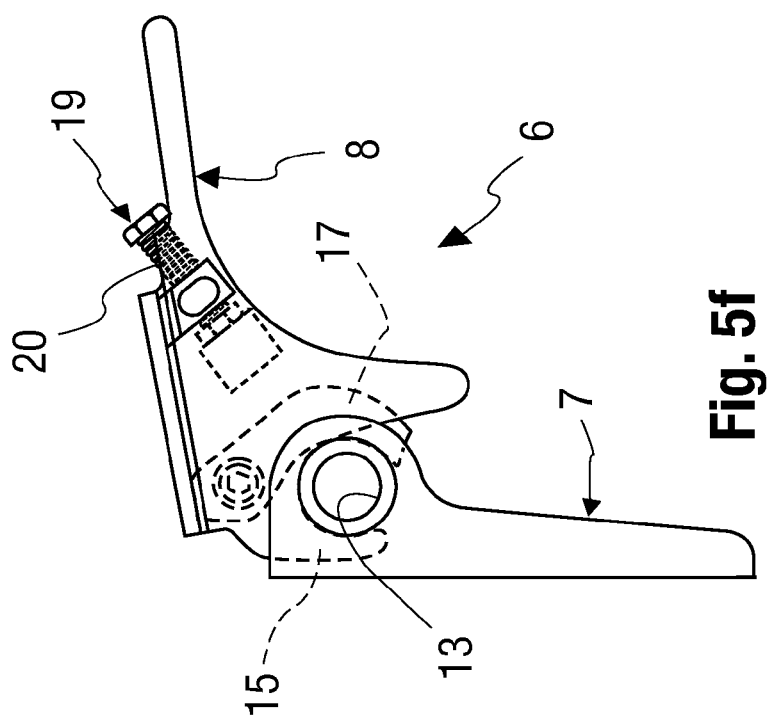

FASTENING DEVICE AND HOLDING DEVICE

CROSS REFERENCE TO RELATED APPLICATIONS

This application claims the benefit of priority under 35 U.S.C. §119 of German Patent Application DE 10 2009 034 722.4 filed Jul. 24, 2009, the entire contents of which are incorporated herein by reference.

FIELD OF THE INVENTION

The present invention pertains to a fastening device for detachably fastening a first component to a second component, especially to a motor vehicle. The present invention pertains, besides, to a holding device with at least one such fastening device.

BACKGROUND OF THE INVENTION

Devices and means are to be fastened to motor vehicles, especially utility vehicles or to other machines, and these devices and means must again be detached when needed, for example, for maintenance purposes. The mounting and removal shall be able to be performed as simply as possible. Fastening devices or holding devices of the type mentioned in the introduction are used for this. These must be able to be operated in a simple manner and operate reliably. For example, components of an exhaust system, for example, an exhaust gas treatment box, are to be mounted on a support frame of a utility vehicle. It may be necessary for maintenance purposes to have the possibility of removing this box in as simple a manner as possible.

SUMMARY OF THE INVENTION

The present invention pertains to the object of providing for a fastening device or for a holding device of the type mentioned in the introduction an improved or at least different embodiment, which is characterized by a reliable mode of operation as well as by simple handling.

The present invention is based on the general idea of equipping the fastening device with a bearing block, an anchor bracket and a locking device. The bearing block has a stay bolt, onto which an anchor hook of the anchor bracket can be hooked. The locking device is adjustable between an unlocking state and a locking state. The anchor hook can be hooked into the stay bolt and detached therefrom in the unlocking state. The stay bolt is fixed to the anchor hook hooked into it in the locking state. The connection thus established is no longer detachable in the locking state. Due to the anchor hook being able to be hooked into the stay bolt, simple handling is achieved for mounting and removing the particular component to be attached. The locking device leads to a high level of reliability of function for the locking state and simplifies mounting and removal in the unlocking state.

Corresponding to an advantageous embodiment, the locking device may be provided with a locking bar, which is mounted at the anchor bracket pivotably about a pivot axis extending in parallel to the stay bolt between a locking position and an unlocking position. The locking bar extends behind the stay bolt in the locking position. As a result, a positive-locking securing of the stay bolt in or at the anchor hook is achieved. The locking bar is released from the stay bolt in the unlocking position, as a result of which the anchor hook can be hooked into the stay bolt and detached therefrom.

Especially advantageous is a variant in which the locking device comprises a securing means, which is adjustable between a securing state and a releasing state. In the securing state the securing means secures the locking bar in the locking position thereof. The securing means releases the locking bar in the releasing state, as a result of which said locking bar is pivotable between its locking position and its unlocking position. A functional separation between locking and securing is achieved here, which simplifies the handling of the fastening device, on the one hand, and improves the quality of the achievable locking, on the other hand.

It is obvious that the above-mentioned features, which will also be explained below, can be used not only in the particular combination indicated but also in other combinations or alone, without going beyond the scope of the present invention.

Preferred embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5a is a side view of the fastening device in one of different states;

FIG. 5b is a side view of the fastening device in another of different states;

FIG. 5c is a side view of the fastening device in another of different states;

FIG. 5d is a side view of the fastening device in another of different states;

FIG. 5e is a side view of the fastening device in another of different states;

FIG. 5f is a side view of the fastening device in another of different states; and FIG. 5g is a side view of the fastening device in still another of different states.

DESCRIPTION OF THE PREFERRED EMBODIMENTS

Figure 1:
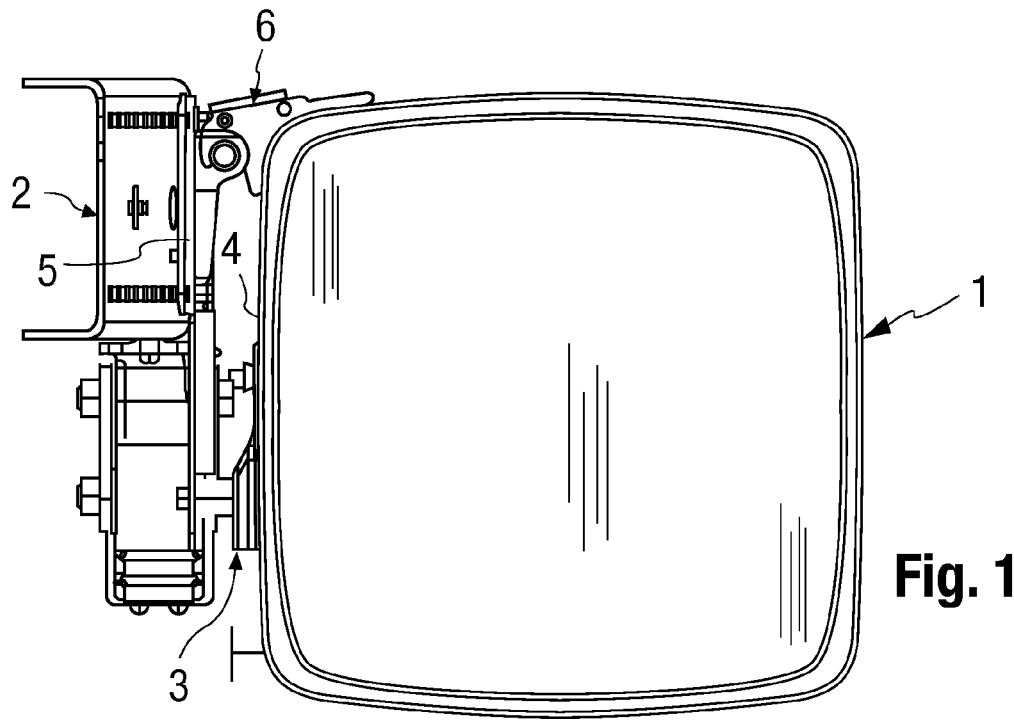
FIG. 1 is a side view of an attached part, which is fastened to a carrier component by means of a holding device according to the invention.

Referring to the drawings in particular, corresponding to FIG. 1, a holding device 3 may be used to detachably mount an attached part 1 on a carrier component 2. The carrier component 2 may be a component of a motor vehicle, not shown otherwise here, especially a side rail or another support structure. Attached part 1 is a box in the example, which may contain, for example, means for exhaust gas treatment.

Figure 2:
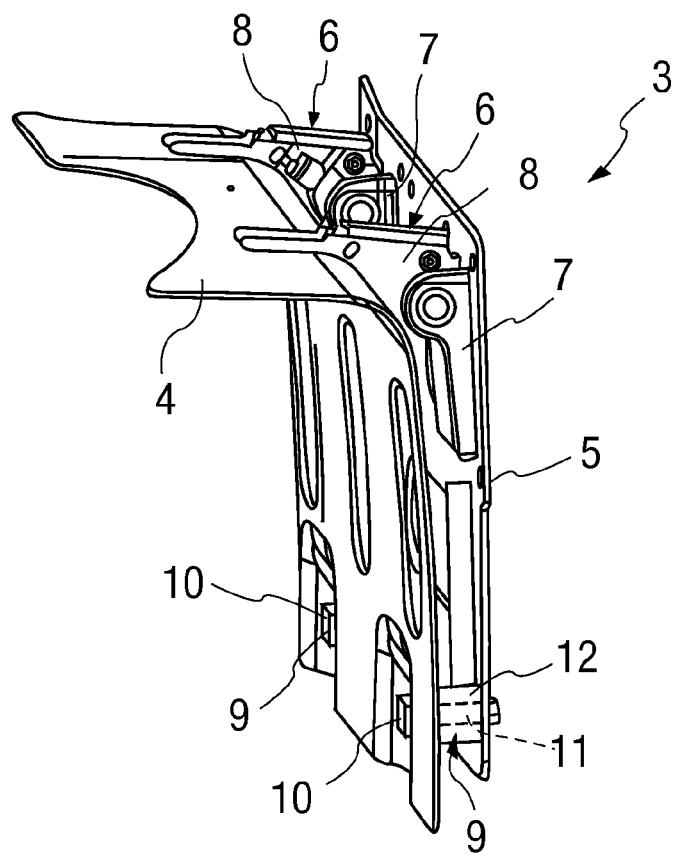
FIG. 2 is a perspective view of the holding device in the mounted state.

Corresponding to FIG. 2, the holding device 3 comprises a mounting bracket 4, which is fastened to the attached part 1 corresponding to FIG. 1. Mounting bracket 4 can be fastened to the attached part 1 by means of clamping clips or by means of screw connections or by means of welded connections or according to another suitable connection technique. Furthermore, the holding device 3 comprises a carrier plate 5, which is fastened to the carrier component 2. For example, carrier plate 5 may be screwed to the carrier component 2. Other suitable fastening techniques are also conceivable here. In addition, the holding device 3 is equipped with at least one fastening device 6. In the preferred example shown, holding device 3 comprises two such fastening devices 6. The two fastening devices 6 are located at spaced locations from one another.

Figure 3:
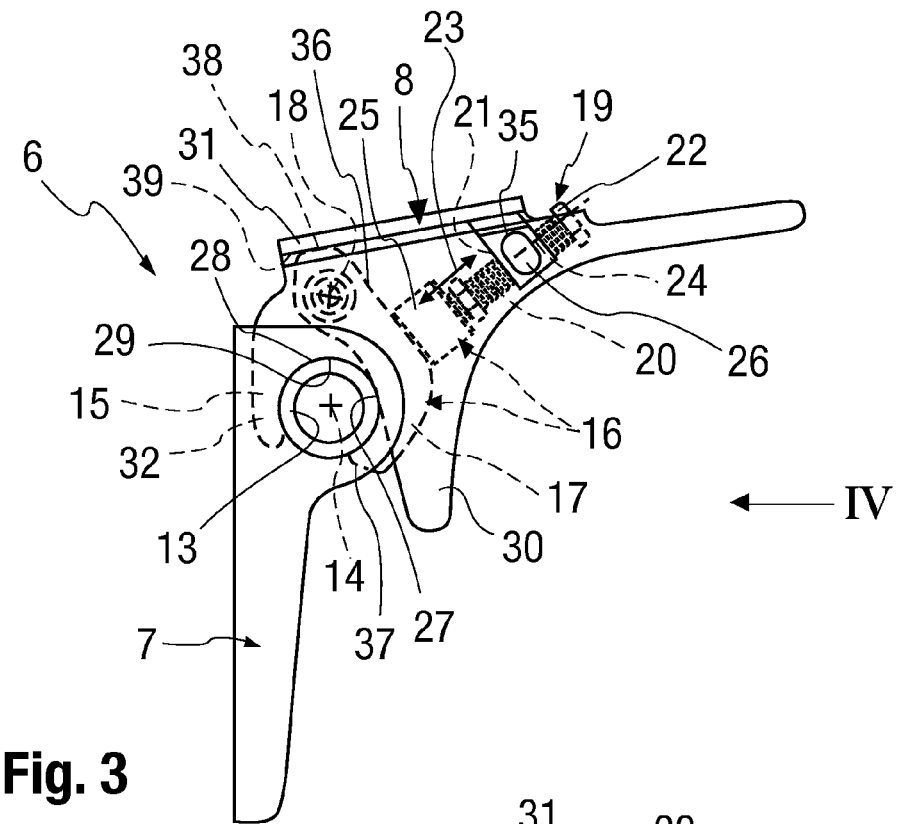
FIG. 3 is a side view of a fastening device.
Figure 4:
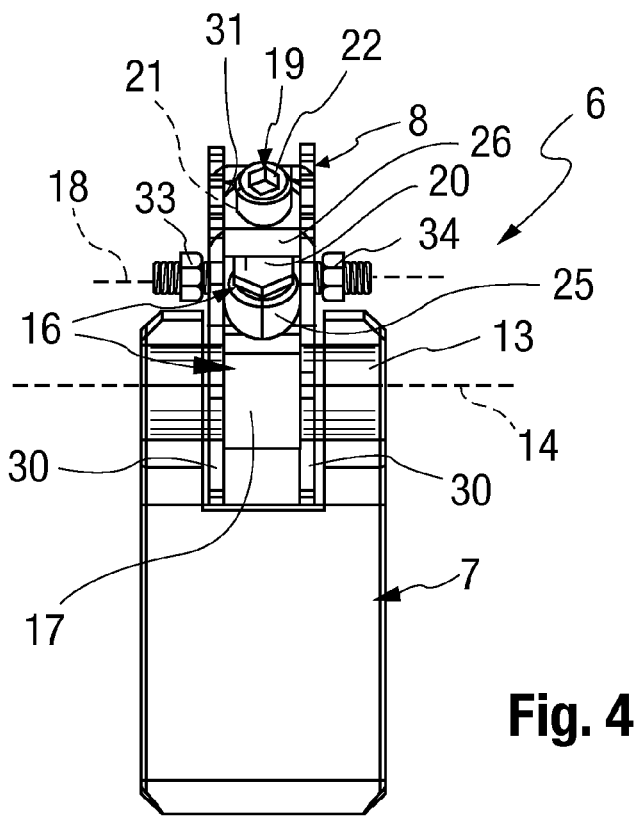
FIG. 4 is a front view of the fastening device corresponding to a direction of view IV in FIG. 3.

Corresponding to FIGS. 2 through 4, such a fastening device 6 is used to detachably fasten a first component, here a mounting bracket 4, to a second component, here the carrier plate 5. The corresponding fastening device 6 comprises for this a bearing block 7, which is fastened to one component, here to a second component 5 or to a plate, here to the carrier plate 5. For example, bearing block 7 is fastened to the corresponding component 5 or to the corresponding plate 5 by means of a welded connection. In addition, the corresponding fastening device 6 comprises an anchor bracket 8, which is fastened to the other component, here to the first component 4 or to another plate, here to the mounting bracket 4. A welded connection is preferred for establishing the fastening in this case as well.

Corresponding to FIG. 2, the holding device 3 may have at least one rotation preventing means 9 securing against rotation at a spaced location from the respective fastening device 6. Such a rotation preventing means 9 securing against rotation is assigned to each fastening device 6 in the example being shown, so that two rotation preventing means 9 securing against rotation are provided here in the example. The respective rotation preventing means 9 securing against rotation has a locking pin 10, which is arranged at one plate, e.g., at the mounting bracket 4, and which is located at a spaced location from the corresponding plate, here from the mounting bracket 4 in the direction of the other plate, i.e., the carrier plate 5 here. Furthermore, the rotation preventing means 9 securing against rotation has, besides, a pin mount 11, which is arranged at the respective other plate, i.e., at the carrier plate 5. The corresponding locking pin 10 meshes with the corresponding pin mount 11 in the mounted state, as a result of which the desired position or securing against rotation by positive locking is achieved.

Corresponding to an advantageous variant, the corresponding rotation preventing means 9 securing against rotation may have, besides, a damping element 12, via which the two plates 4, 5 are supported at each other in the mounted state. Damping element 12 is designed in the example as a cylindrical sleeve and is arranged coaxially with the locking pin 10. In addition, pin mount 11 is arranged in the interior of the damping element 12 here. In particular, pin mount 11 may be integrated within the damping element 12. Damping element 12 may consist, for example, of a rubber-elastic plastic.

Corresponding to FIGS. 3 and 4, bearing block 7 has a stay bolt 13, which has a cylindrical shape in the example and has a central longitudinal axis that is at right angles to the drawing plane in FIG. 3. Furthermore, stay bolt 13 is designed as a hollow body.

The anchor bracket 8 has an anchor hook 15, which is designed such that it can be hooked into the stay bolt 13. In addition, a locking device 16, which is adjustable between a locking state shown, e.g., in FIGS. 3 and 5g, and an unlocking state shown in FIGS. 5a through 5f, is formed at the anchor bracket 8. Anchor hook 15 can be hooked in the unlocking state into the stay bolt 13 and detached from same. Stay bolt 13 is fixed to the anchor hook 15 hooked into it in the locking state. Locking device 16 has a locking bar 17 for this purpose. This locking bar is pivotable at the anchor bracket 8 about a pivot axis 18. This pivot axis 18 extends in parallel to the stay bolt 13 or in parallel to the central longitudinal axis 14 thereof. Locking bar 17 is pivotable about its pivot axis 18 between a locking position according to FIGS. 3, 5a, 5b, 5f and 5g and an unlocking position according to FIGS. 5c, 5d and 5e. Locking bar 17 extends behind the stay bolt 13 hung into the anchor hook 15 in the locking position, as a result of which said stay bolt is fixed to the anchor hook 15 in a positive-locking manner. Locking bar 17 is released from the stay bolt 13 in the unlocking position, as a result of which anchor hook 15 is detachable from the stay bolt 13 or can be hung into same.

Locking device 16 comprises, moreover, a securing means 19. This is adjustable between a securing state shown in FIGS. 3 and 5g and a releasing state shown in FIGS. 5a through 5f. In its securing state, said securing means 19 secures the locking bar 17 in the locking position thereof, as a result of which locking bar 17 cannot be pivoted into its unlocking position any longer. Securing means 19 releases locking bar 17 in its releasing state, so that the locking bar 17 is pivotable between its locking position and its unlocking position. Securing means 19 is likewise arranged at the anchor bracket 8.

In the example being shown, the securing means 19 comprises a securing element 20, which is arranged adjustably at the anchor bracket 8, namely, such that said securing element is adjustable between a securing position shown in FIGS. 3 and 5g and a releasing position shown in FIGS. 5a through 5f. Securing element 20 protrudes into a pivoting path of locking bar 17 in its securing position and thereby prevents locking bar 17 from being pivoted out of the locking position thereof into the unlocking position thereof. Securing element 20 is now directly or indirectly supported at locking bar 17. Securing element 20 has moved out of the pivoting path of locking bar 17 in the releasing position, so that locking bar 17 can be pivoted unhindered between its locking position and its unlocking position. The variant being shown is preferred here, in which the securing element 20 is arranged in anchor bracket 8 in a linearly adjustable manner. For example, securing element 20 may be a screw with external threads, which cooperates with internal threads or threads 21 formed on the anchor bracket 8. This screw will hereinafter likewise be designated by 20. Screw 20 may have a screw head 22 in the usual manner, which has a hexagon socket in the example, in order to make it possible to drive said screw 20 in a rotating manner.

An adjusting direction 23 of securing element 20 indicated by a double arrow in FIG. 3 preferably extends at right angles to the stay bolt 13. The adjusting direction 23 is at right angles to the central longitudinal axis 14 of the stay bolt 13 in the state in which it is hung. It is especially advantageous if a central longitudinal axis 24 of securing element 20 extends at right angles to the central longitudinal axis 14 of stay bolt 13 in the state in which anchor hook 15 is hung. Securing element 20 may have a support body 25 to support securing element 20 at locking bar 17. This support body 25 is arranged movably at the securing element 20, as a result of which deviations in position between locking bar 17 and securing element 20 can be compensated. Securing element 20 is thus supported via the support body 25 indirectly at locking bar 17. The mobile support body 25 may be designed, for example, as a ball socket nut. It is likewise possible to design the mobile support body 25 as a barrel nut. Other mobile embodiments of the support body 25 are possible as well.

The aforementioned threads 21, with which screw 20 cooperates, are formed in a threaded body 26 in the embodiment being shown here. This threaded body 26 is attached to the anchor bracket 8.

Locking bar 17 has a circular arc contour 27 on an inner side facing the stay bolt 13. Locking bar 17 is in contact with a regular cylindrical outer contour 28 of stay bolt 13 via said circular arc contour 27 in the locking position. This leads to a comparatively low load on the component at the contact site. The anchor hook 15 may advantageously also have a circular arc contour 29 on an inner side facing stay bolt 13, with which contour 29 stay bolt 13 is in contact in the hooked-in state. A reduction of the load on the contact site is achieved here as well. The circular arc contour 29 of the anchor hook 15 extends over less than 180° in the circumferential direction of stay bolt 13. As a result, stay bolt 13 can be hooked into and unhooked from the anchor hook 15 in a simple manner. Contrary to this, the circular arc contour 27 of locking bar 17 extends, e.g., over about 90°. The circular arc contour 29 of the anchor hook 15 and the circular arc contour 27 of locking bar 17 add up in the locking state such that stay bolt 13 is wrapped around by more than 180° in the locking state. The two circular arc contours 27 and 29 wrap around the stay bolt 13 by about 270° in the example being shown. An intensive positive locking is obtained hereby, which makes it possible to effectively tie the anchor bracket 8 to the bearing block 7.

For low-cost manufacture, the anchor bracket 8 corresponding to the example being shown here may have two side parts 30 located at spaced locations from one another and a connection part 31, which connects the two side parts 30 to one another. The two side parts 30 have their edges shaped such that they have a hook 32 each, the two hooks 32 together then forming the anchor hook 15. Locking bar 17 is arranged between the two side parts 30. For example, locking bar 17 may be arranged pivotably at the side parts 30 by means of a screw 33 and a nut 34. Securing means 19 is also accommodated between the two side parts 30 in the example. In particular, the threaded body 26 mentioned above is fixed to the side parts 30. Side parts 30 may have an opening each 35 for this, which meshes with a complementarily shaped projection of the threaded body 26 in a positive-locking manner.

Anchor bracket 8 is advantageously designed as a shaped sheet metal part and can be manufactured from a single piece of sheet metal by forming. Bearing block 7 may also be a shaped sheet metal part. Bearing block 7 may also be a cast part. Stay bolt 13 is advantageously inserted into bearing block 7. It may be soldered or welded to the bearing block 7. Press fit is conceivable as well. Furthermore, integral design of the bearing block 7 and stay bolt 13 is conceivable as well.

The selected shape of the stay bolt 13, namely, the cylindrical outer contour 28 and the inner contours 27, 29 of locking bar 17 and of the anchor hook 15, which said contours are complementary thereto, leads to rotatability of the anchor bracket 8 about the central longitudinal axis 14 of stay bolt 13 when the anchor bracket 8 is arranged at bearing block 7. Depending on the frictional forces occurring, this rotatability may also be obtained in the locking state and especially also in the securing state.

It is remarkable, furthermore, that the pivot axis 18 of locking bar 17 is arranged above the stay bolt 13 in the mounted state and extends especially vertically above the central longitudinal axis 14 of stay bolt 13.

On its outside facing away from the stay bolt 13, locking bar 17 has a flat contact surface in the example being shown, at which securing element is supported, especially via support body 25. This support takes place at right angles in the securing state, i.e., the adjusting direction 23 of securing element 20 is at right angles to the flat outside 36 of locking bar 17. Furthermore, locking bar 17 is provided at its end that is located away from the pivot axis 18 with a ramp contour 37, which makes it possible for the locking bar 17 to automatically pivot up into an unlocking position when the anchor hook 15 is hooked into stay bolt 13. In addition, locking bar 17 is provided with a stop contour 38, which comes into contact with a corresponding stop 39 of anchor bracket 8 when the locking position is reached. Stop 39 is formed in the example by the inside of the connection part 31, which said inside faces locking bar 17. The cooperation of the stop contour 38 with stop 39 prevents pivoting of locking bar 17 beyond the locking position when the anchor hook 15 is removed from stay bolt 13, which could prevent the anchor hook 15 from being hooked into the stay bolt 13.

Anchor bracket 8 is hooked onto the bearing block 7 corresponding to FIGS. 5a through 5g as follows:

Securing means 19 is moved into its releasing state in FIGS. 5a through 5f. Securing element 20 assumes its releasing position. Locking bar 17 is freely pivotable as a consequence about its pivot axis 18. Securing element 20 has now been moved out of the pivoting path of locking bar 17 and releases the locking bar 17 as a result for pivoting.

There is no interaction between the anchor bracket 8 and bearing block 7 in FIG. 5a. Locking bar 17 assumes its locking position due to the cooperation of the stop contour 35 with stop 39.

A first contact develops between locking bar 17 and the stay bolt 13 in FIG. 5b due to the anchor bracket 8 approaching bearing block 7. This contact takes place in the area of the ramp contour 37 of locking bar 17.

Corresponding to FIG. 5c, a coming closer of the anchor hook 15 relative to the stay bolt 13 brings about an upward pivoting of locking bar 17 into the unlocking position thereof due to the cooperation of ramp contour 37 with the stay bolt 13.

Corresponding to FIGS. 5d and 5e, locking bar 17 can increasingly extend around the stay bolt 13 along with a progressive coming closer between the anchor hook 15 and stay bolt 13.

Locking bar 17 has again reached its locking position in FIG. 5f, in which it extensively extends around stay bolt 13. At the same time, anchor hook 15 is hooked fully into the stay bolt 13 in this state.

The securing means 19 is subsequently moved into its securing state corresponding to FIG. 5g. This means in this case that securing element 20 is moved over into its securing position. Securing element 20 has moved into the pivoting path of locking bar 17 in this case. Furthermore, it is directly or indirectly supported at locking bar 17 and prevents pivoting out of the locking position. A securing force can now be introduced into the system corresponding to an arrow 40 in order to prestress locking bar 17 against the stay bolt 13 and hence the stay bolt 13 into the anchor hook 15. The securing force 40 may be limited by the interaction between the stop contour 38 and stop 39. Furthermore, this securing force 40 may also be limited by the contact of the screw head 22 with the threaded body 26.

While specific embodiments of the invention have been described in detail to illustrate the application of the principles of the invention, it will be understood that the invention may be embodied otherwise without departing from such principles.

What is claimed is:

1. A fastening device for detachably fastening a first motor vehicle component to a second motor vehicle component, the fastening device comprising:
   a bearing block fastened to one component, the bearing block having a stay bolt;
   an anchor bracket fastened to the other component; and
   a pivotable connection, the anchor bracket having an anchor hook for hooking into the stay bolt and having a locking device which is adjustable between an unlocking state, in which said anchor hook can be hooked into the stay bolt, and a locking state, in which the stay bolt is fixed at the anchor hook hooked thereinto, said locking device comprising a locking bar, said locking bar being pivotably connected to said anchor bracket via said pivotable connection, said locking bar being pivotable about a pivot axis extending parallel to the stay bolt for pivoting movement between a locking position, in which said locking bar extends behind the stay bolt, and an unlocking position, in which said locking bar is released from the stay bolt, said locking device further comprising a securing device, which is adjustable between a securing state, in which the securing device secures the locking bar in the locking position thereof, and a releasing state, in which the securing device releases the locking bar, said securing device being in direct contact with said locking bar in said securing state, wherein said securing device applies a force to said locking bar in said securing state to fix said locking bar in said locking state.

2. A fastening device in accordance with claim 1, wherein the securing device comprises a securing element arranged adjustably at the anchor bracket between a securing position, in which the securing element protrudes into a pivoting path of the locking bar moved in the locking position thereof and is directly or indirectly supported at locking bar, and a releasing position, in which the securing element is moved out of the pivoting path of locking bar.

3. A fastening device in accordance with claim 2, wherein the securing element is arranged linearly adjustably at the anchor bracket, said securing element blocking movement of said locking bar along said pivoting path in said securing position, said securing device being located at a spaced location from said stay bolt with said locking bar in said locked position and with said locking bar in said unlocked position.

4. A fastening device in accordance with claim 3, wherein an adjusting direction of the securing element extends at right angles to the stay bolt and extends at right angles to a central longitudinal axis of the stay bolt in a state in which the securing element is connected to the stay bolt.

5. A fastening device in accordance with claim 2, further comprising a movable support body wherein the securing element carries the movable support body, the movable support body for supporting the securing element in a securing element securing position at the locking bar.

6. A fastening device in accordance with claim 5, wherein the support body is a ball socket nut or a barrel nut.

7. A fastening device in accordance with claim 2, wherein the securing element comprises a screw cooperating with threads formed on the anchor bracket.

8. A fastening device in accordance with claim 7, wherein the threads are formed in a threaded body attached to the anchor bracket.

9. A fastening device in accordance with claim 1, wherein the locking bar has a circular arc contour on an inside facing the stay bolt, the locking bar circular arc contour being in contact with a regular cylindrical outer contour of the stay bolt in the locking position, said locking bar being pivotable relative to said securing device.

10. A fastening device in accordance with claim 1, wherein the anchor hook has a circular arc contour on an inside facing the stay bolt, the anchor hook circular arc contour being in contact with a regular cylindrical outer contour of said stay bolt in the hooked-in state.

11. A fastening device in accordance with claim 9, wherein:
   the anchor hook has a circular arc contour on an inside facing the stay bolt, the anchor hook circular arc contour being in contact with a regular cylindrical outer contour of said stay bolt in the hooked-in state;
   the anchor hook circular arc contour extends over less than 180° in the circumferential direction of the stay bolt; and
   the anchor hook circular arc contours extends over more than 180° in the circumferential direction of stay bolt in the locking state.

12. A fastening device in accordance with claim 1, wherein:
   the anchor bracket has two side parts, which are located at spaced locations from one another and a connection part connecting the two side parts with one another, and
   the side parts form a hook at their edges, which together form the anchor hook.

13. A fastening device in accordance with claim 1, wherein:
   the anchor bracket has two side parts, which are located at spaced locations from one another and a connection part connecting the two side parts with one another,
   the side parts form a hook at their edges, which together form the anchor hook; and
   the locking bar is arranged between the side parts.

14. A holding device for detachably mounting an attached part on a motor vehicle carrier component, the holding device comprising:
   a mounting bracket fastened to the attached part or said mounting bracket being fastenable to the attached part;
   a carrier plate fastened to the carrier component; and
   a fastening device comprising:
      a bearing block fastened to one of the mounting bracket and the carrier plate, the bearing block having a stay bolt;
      a pivotable connection; and
      an anchor bracket fastened to the other of the mounting bracket and the carrier plate, the anchor bracket having an anchor hook for hooking into the stay bolt and having a locking device, said locking device comprising a locking bar and a securing device, said locking bar being pivotably mounted on said anchor bracket via said pivotable connection, said locking bar being adjustable about an axis parallel to said stay bolt between an unlocking state, in which said anchor hook can be hooked into the stay bolt, and a locking state, in which the stay bolt is fixed at the anchor hook hooked thereinto, wherein said locking bar moves relative to said anchor hook between said unlocking state and said locking state, at least a portion of said securing device engaging said locking bar in said locking state, said securing device being located at a spaced location from said locking bar in said unlocking state.

15. A holding device in accordance with claim 14, further comprising at least one rotation preventing device securing against rotation, the rotation preventing device having a securing pin arranged at one of the mounting bracket and the carrier plate and a pin mount arranged at the other of the mounting bracket and the carrier plate, the securing pin being insertable into the pin mount, the securing device being provided at a spaced location from the corresponding fastening device.

16. A holding device in accordance with claim 15, wherein the rotation preventing device has a damping element, via which the mounting bracket and the carrier plate are supported on each other.

17. A holding device in accordance with claim 14, wherein the locking bar is mounted pivotably at the anchor bracket about a pivot axis extending in parallel to the stay bolt for pivoting movement between a locking position, in which said locking bar extends behind the stay bolt, and an unlocking position, in which said locking bar is released from the stay bolt, wherein said locking bar is pivotable relative to said securing device.

18. A holding device in accordance with claim 17, wherein the securing device is adjustable between a securing state, in which the securing device secures the locking bar in the locking position, and a releasing state, in which the securing device releases the locking bar, said securing device being located at a spaced location from said stay bolt in said securing state and said releasing state.

19. A fastening device in accordance with claim 1, wherein said locking bar is movable relative to said anchor hook between said unlocking state and said locking state, said locking bar being movable based on movement of said securing device.

\* \* \* \* \*